United States Patent [19]
McKee

[11] 3,980,121
[45] Sept. 14, 1976

[54] BRACKET FOR USE IN A RETRACTABLE AWNING

[75] Inventor: Donald S. McKee, Louisville, Colo.

[73] Assignee: The Scott & Fetzer Company, Lakewood, Ohio

[22] Filed: Feb. 26, 1975

[21] Appl. No.: 552,972

[52] U.S. Cl. .............................. 160/71; 135/5 AT; 160/80; 248/240
[51] Int. Cl.² ......................................... E04F 10/06
[58] Field of Search ....................... 160/66, 71–74, 160/80–82, 67; 135/5 AT, 5 A; 248/240, 240.1, 240.4, 241, 242, 291, 300, 273, 351; 403/85

[56] References Cited
UNITED STATES PATENTS

| 1,125,064 | 1/1915 | Connell............................ 248/300 X |
| 1,403,551 | 1/1922 | Holloway et al.................... 248/300 |
| 1,664,958 | 4/1928 | Zeiser............................ 248/240.4 X |
| 2,561,225 | 7/1951 | Powell................................... 160/81 |
| 3,847,171 | 11/1974 | Akers et al....................... 135/5 AT |
| 3,866,874 | 2/1975 | Upton, Jr............................ 160/72 X |

Primary Examiner—Roy D. Frazier
Assistant Examiner—William E. Lyddane
Attorney, Agent, or Firm—Burton, Crandell & Polumbus

[57] ABSTRACT

A bracket mountable on a supporting surface for retaining a pair of awning support members in a retracted juxtapositional storage position has a pair of side plate members retained in spaced parallel vertically oriented relationship by a cross-web member defining uniform channels on opposite sides thereof. The side plate members pivotally support the lower end of one of the support members and defines a space rearwardly of the one support member into which the lower end of the other support member can be inserted to retain the support members in juxtapositional relationship adjacent to the supporting surface.

4 Claims, 9 Drawing Figures

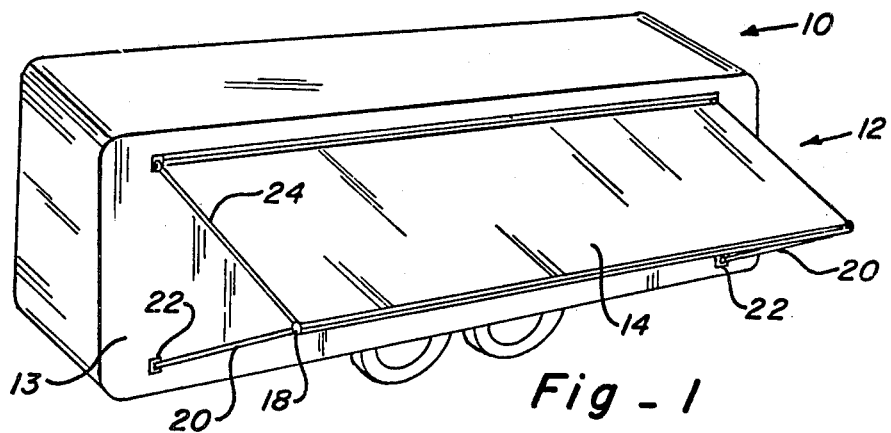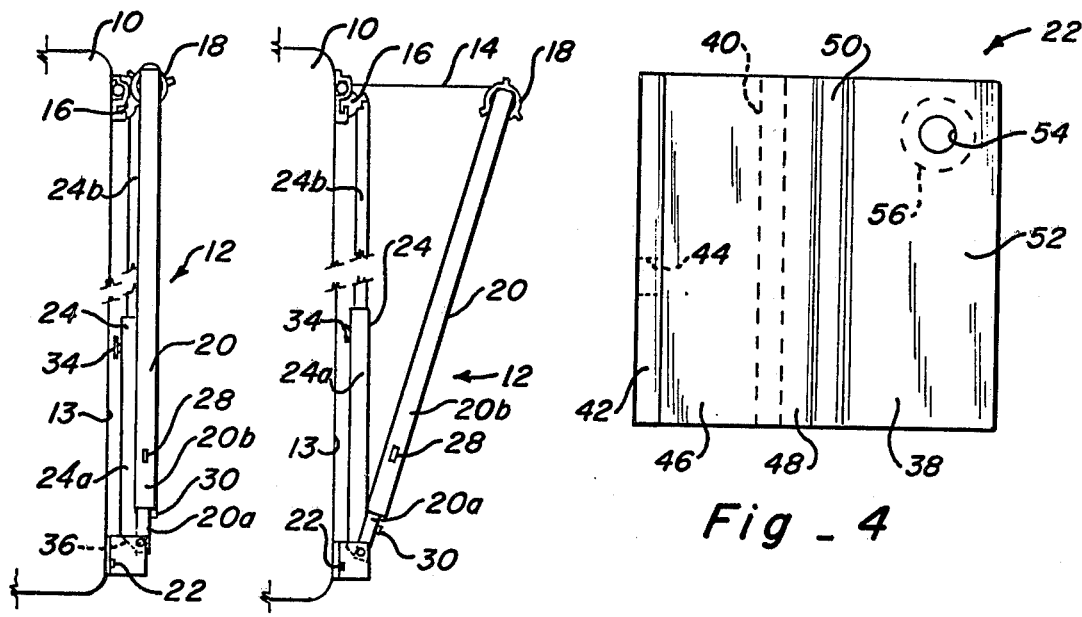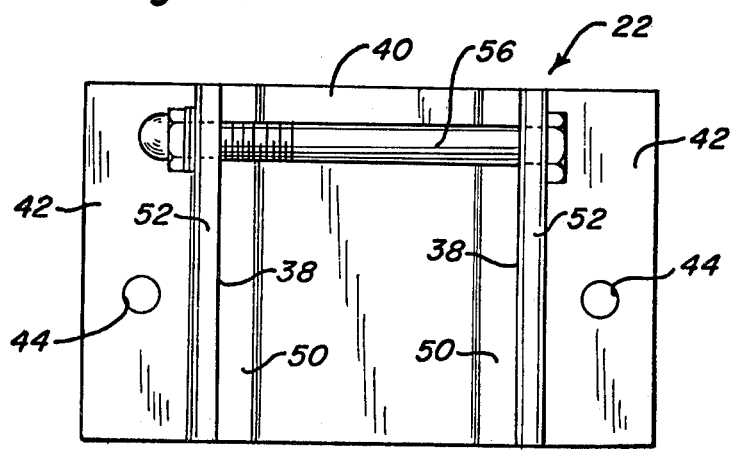

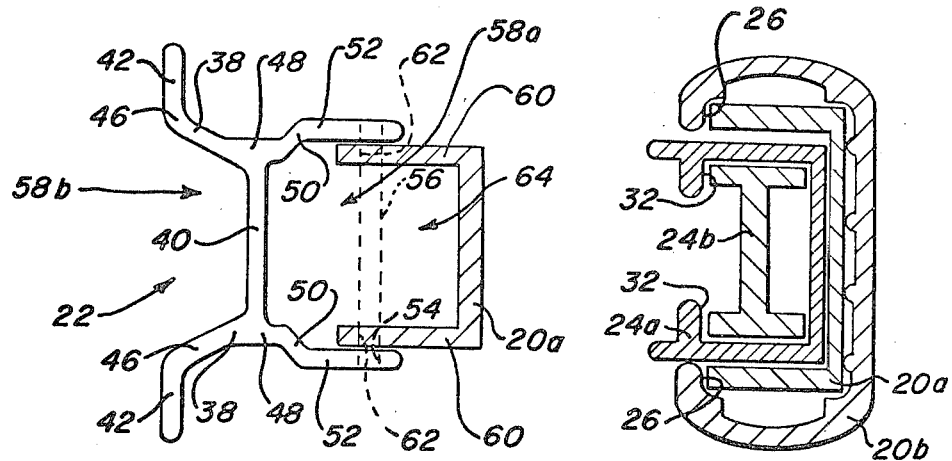
Fig_6 Fig_7
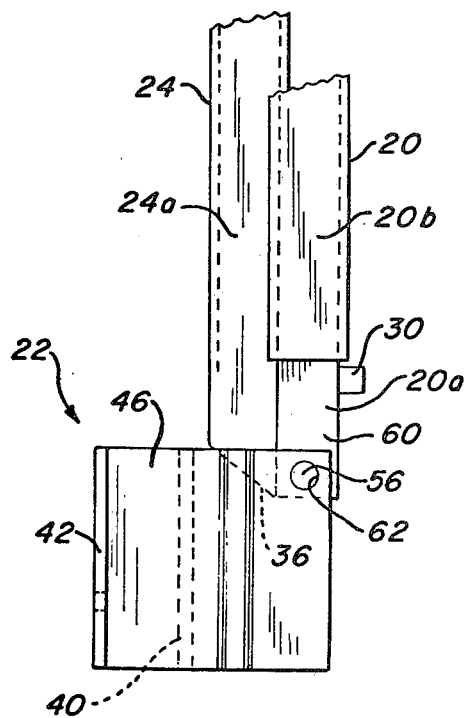
Fig_8
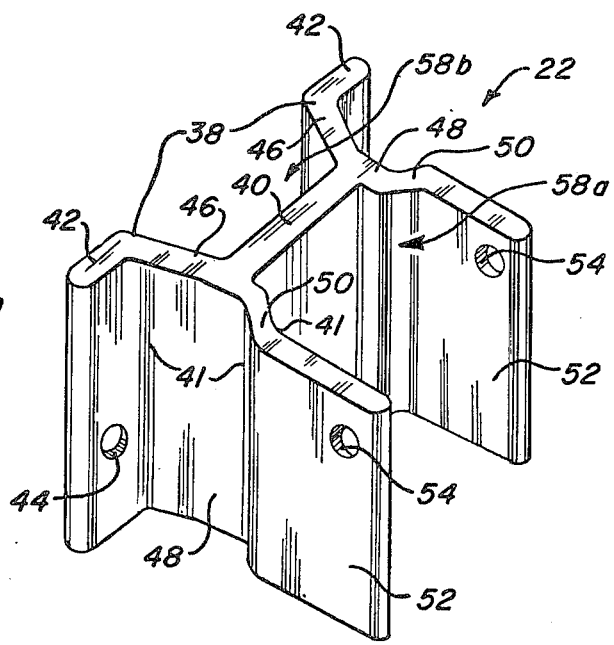
Fig_9

3,980,121

BRACKET FOR USE IN A RETRACTABLE AWNING

BACKGROUND OF THE INVENTION

The present invention relates generally to retractable awnings and more particularly to a bracket for use with a retractable awning which is adapted to retain a pair of supporting arms in confined juxtapositional relationship when the awning is in a retracted position.

Retractable awnings of the type which are adapted to be extended from a retracted position adjacent to a supporting surface to an extended position wherein an awning sheet protrudes outwardly away from the supporting surface have long been a desirable item for a window covering, patio cover and the like. With the recent advent of the recreational-type vehicles or motor homes, retractable awnings have taken on numerous designs so that they can be quickly and easily extended into a use position when the recreational vehicle is not in motion and just as quickly and easily retracted into a storage position adjacent to the side of the vehicle. When in the storage position, it is important that the component parts of the retractable awning be securely positioned so that when the recreational vehicle is in motion the air currents along the side of the vehicle do not damage or release the awning from its retracted storage position. To this end, numerous supporting and bracing arm arrangements have been developed which cooperate with brackets mounted on the side of the vehicle to positively and reliably secure the supporting arms as well as the remainder of the awning assembly adjacent the side of the vehicle. An example of such an awning assembly is disclosed in U.S. Pat. No. 3,866,874 of Albert Upton, Jr. which is of common ownership with the subject application.

OBJECTS OF THE INVENTION

It is an object of the present invention to provide a new and improved bracket for positively and reliably retaining the supporting components of an awning adjacent the side of a recreational vehicle so that they do not become dislodged at high travel speeds of the vehicle.

It is another object of the present invention to provide a new and improved bracket for reliably and securely retaining the component parts of a retractable awning adjacent the side of a recreational vehicle when the awning is in a retracted storage position with the bracket being designed so as to be extrudable in a simplified economical manner.

SUMMARY OF THE INVENTION

The bracket of the present invention has been primarily designed for use with a retractable awning which includes an awning sheet securable along one edge to a supporting surface, an awning sheet lead bar secured to said awning sheet along another edge, a pair of elongated support arms having said awning sheet bar mounted on the upper ends thereof, and a pair of upper brackets mounted on the supporting surface and pivotally retaining the upper ends of a pair of brace members the other ends of which operatively engage the awning sheet bar when the awning is extended into a use position to aid in retaining the awning in the extended use position.

The bracket of this invention is ideally suited for supporting the lower end of one of the support arms in a manner such that the support arm is free to pivot between an extended position wherein it angles away from the supporting surface to support the extended outer edge of the awning sheet in a retracted position wherein it lies closely adjacent to the supporting surface. The brace member is adapted to be extended in a juxtapositional relationship with the support arm when the awning is in the retracted position and the bracket is designed to cooperate with the support arm in retaining the lower end of the brace member so that the brace member is secured adjacent to the supporting surface when the awning is retracted and not in use.

The bracket includes a pair of side plate members retained in parallel spaced relationship by an interconnecting web member which establishes uniform channels on opposite sides thereof. The side plate members support a pivot pin which passes through the lower end of the support arm in such a manner that the lower end of the support arm, the side plate members and web of the bracket define a seat or pocket into which the lower end of the brace member can be retained in a positive and reliable manner when the awning is retracted.

Other objects, advantages and capabilities of the present invention will become more apparent as the description proceeds taken in conjunction with the accompanying drawings.

BRIEF DESCRIPTION OF THE DRAWINGS

FIG. 1 is a perspective view of a recreational vehicle having an awning mounted thereof utilizing the bracket of the present invention.

FIG. 2 is an end elevational view with portions removed showing the awning of FIG. 1 in a retracted position.

FIG. 3 is an end elevational view similar to FIG. 2 with portions removed showing the awning in a partially extended position.

FIG. 4 is a side elevational view of the bracket of the present invention.

FIG. 5 is a front elevational view of the bracket of the present invention.

FIG. 6 is a top plan view of the bracket of the present invention with a support arm of the awning shown in FIG. 1 connected thereto.

FIG. 7 is a transverse section taken through the awning support arm and brace members in nested relationship as they are received in the bracket when the awning is retracted.

FIG. 8 is a side elevational view of the bracket of the present invention with the awning support arm and brace members positioned therein in the retracted position of the awning, and FIG. 9 is a perspective view of the bracket of the present invention.

DESCRIPTION OF THE PREFERRED EMBODIMENT

Referring first to FIG. 1, a recreational vehicle 10 is shown with an awning assembly 12 mounted on the side 13 thereof in an extended use position. As is also seen in FIGS. 2 and 3, the awning assembly 12 includes an awning sheet 14 of a flexible material, such as vinyl, secured along an inner edge as by an upper bracket 16 to the side of the recreational vehicle adjacent the top thereof. The opposite or outer edge of the awning sheet 14 is secured to a conventional roll bar 18 adapted to automatically roll the awning sheet therearound when the awning is moved from the extended position of FIG.

1 to a retracted position as shown in FIG. 2. The roll bar 18 is supported at opposite ends by a pair of extensible support arms 20 which are pivotally supported at their lower end by lower brackets 22. The roll bar is retained in the extended position of FIG. 1 by a pair of brace members 24 which are pivotally connected to the upper bracket 16 and are also extensible so as to operably engage the associated ends of the roll bar and extend along the edge of the awning sheet 14 when the awning is in use. When not in use, the brace members 24 are adapted to extend along the side wall 13 of the vehicle in parallel juxtapositional relationship with the support arms and are retained in this relationship by the lower brackets 22.

FIG. 7 better illustrates the relationship of a support arm 20 and brace member 24 when in the retracted storage position and it will be appreciated that the brace member actually nests inside the associated support arm. Each of the support arms consists of a pair of channeled sections 20a and 20b with the lower section 20a being of a smaller size than the upper section 20b and being confined within a groove 26 provided in the upper section for relative longitudinal sliding movement. A set screw 28, FIG. 3, is provided to selectively fix the longitudinal relationship of the upper and lower sections 20b and 20a respectively of the support arm such as when the awning is fully extended, retracted or positioned at any intermediate position. A stop 30, FIGS. 2, 3, and 8, is provided on the lower section to limit the downward movement of the upper section relative thereto such as when the awning is in the retracted position and so that the roll bar 18 will be properly positioned for cooperation with the upper bracket 16 for securing the awning in the retracted position as more fully described in the aforementioned U.S. Pat. No. 3,866,874 which is of common ownership with the subject application.

The brace members 24, as seen in FIG. 7, can also be seen to consist of telescoping sections 24a and 24b with the larger section 24a being the lower section of the brace member and defining a groove 32 therethrough in which the inner or upper section 24b is longitudinally slidable. The upper section 24b is of H-shaped cross section and as can be seen in FIGS. 2 and 3, a set screw 34 is provided to selectively fix the longitudinal relationship of the brace members in accordance with the positioning of the awning assembly. As best seen in FIGS. 2, 3 and 8, the lower end of the lower section 24a of the brace member is beveled at 36 so as to incline downwardly and away from the side 13 of the vehicle when the brace member is in the retracted storage position. The bevel on the lower end of the brace member is designed to cooperate with the upper end of the support arm 20 in bracing the awning in the extended position, as more fully described in the aforementioned U.S. Pat. No. 3,866,874, but as will be appreciated with the description hereinafter of the lower bracket 22, the beveled lower end of the brace member also serves as a cam to guide the lower end of the brace member into the desired nesting relationship with the support arm when storing the awning in the retracted position.

Referring now to FIG. 9, which best illustrates the lower bracket 22, it can be seen to consist of a pair of side arms or plate members 38 and an interconnecting web 40 holding the side members 38 in parallel spaced relationship. The side plate members are identical having a plurality of bends 41 therein extending parallel to the web to define distinct portions of the plate members set forth hereinafter. The rearwardmost ends of the plate members are bent outwardly defining attachment flanges 42 for securing the bracket to the side 13 of the recreational vehicle or the like and each flange is provided with an opening 44 therethrough to receive a conventional fastener (not shown) such as a screw, bolt or the like. The side members 38 have forwardly convergent portions 46 extending forwardly from the innermost edges of the flanges. The forwardly convergent portions 46 are continuous with intermediate parallel portions 48 of the bracket which in turn are continuous with forwardly divergent portions 50. The forwardly divergent portions 50 of the side members are continuous with parallel front portions 52, each of which is also provided with an aperture 54 therethrough, aligned with the aperture 54 in the opposite front portion 52, for receiving a pivot pin 56, FIG. 5. The interconnecting web 40 joins the intermediate parallel portions 48 of the side members defining channels 58a and 58b on opposite sides thereof.

The parallel front portions 52 of the side members 38 have a spacing which is slightly greater than the spacing between the side leg portions 60 of the lower section 20a of the support arms 20. The side legs 60 of the lower section of each support arm are adapted to fit between the front parallel portions 52 of the bracket 22 so as to fit along the inside of the front portions and openings 62 are provided near the lower end of the support arms for receiving the pivot pin 56 so that the lower end of the support arms can be pivotally mounted upon the bracket.

It will be appreciated by reference to FIG. 6, that the lower end of the support arms 20 cooperate with the front portions 52 and web 40 of the bracket 22 in defining an enclosed area 64, FIG. 6, in which the lower end of the brace member 24 is received when the awning is retracted. When moving the awning from the extended position of FIG. 1, to the retracted position of FIG. 2, wherein the support arms and brace members are positioned adjacent the side of the vehicle, the brace members are first released from their connection to the outer ends of the support arms so that they are allowed to hang freely from their pivotal connection to the upper brackets 16 along the side of the vehicle. The brace members are shortened until the lower ends thereof fit over the lower bracket 22 and are then lengthened until the lower end protrudes into the enclosed area 64 defined by the lower end of the associated support arm, the front portions and the web of the bracket. In this regard, it will be appreciated that the beveled lower end 36 of the brace member can engage the web 40 to cam the brace member in a forward direction into the enclosed area 64 described. With the lower end of the brace member protruding into the lower bracket, the longitudinal relationship of the upper and lower sections thereof are locked with the set screw 34 and the support arms supporting opposite ends of the roll bar 18 are then swung inwardly about the pivot pin 56 on the lower bracket until the roll bar is positioned on the upper bracket whereupon the longitudinal relationship of the upper and lower sections 20b and 20a respectively of the support arms are fixed with the set screw 28 provided. In this manner, the selectively fixed length of the support arms locks the roll bar in the upper bracket, as described in more detail in the aforementioned U.S. Pat. No. 3,866,874 and the brace member is positively and securely positioned adjacent the side of the vehicle in nested relationship within the associated support arm to positively prevent the awning from being released from its retracted storage position even when the vehicle is traveling at high speeds. It should also be noted that since the parallel front portions 52 of the bracket, to which the support arms are attached, are wider apart than the intermediate parallel portions 48, the intermediate parallel portions 48 will guide the lower end 36 of brace member 24a into a centered position between the front portion 52 where there will be no interference from the side legs 60 of the support arm when the brace member is inserted into the bracket.

It should be appreciated, that the design of the bracket 22 is such that the bracket can be easily and economically extruded, such as from aluminum, into the transverse cross-sectional configuration shown in FIG. 6, and cut into preselected lengths of approximately 2 to 3 inches to form the bracket as it is best seen in FIG. 9. With the bracket extending along the side 13 of the vehicle 10 for a preselected length, such as 2 to 3 inches, very stable connection with the side of the vehicle is established.

Although the present invention has been described with a certain degree of particularity, it is understood that the present disclosure has been made by way of example and that changes in details of structure may be made without departing from the spirit thereof.

I claim:

1. In a retractable awning assembly having an awning sheet securable on one edge to a supporting surface, an awning sheet bar secured to said awning sheet along another edge thereof, a pair of elongated support arms having said awning sheet bar mounted on the upper ends thereof, a pair of first bracket means mounted on said supporting surface, a pair of brace members each pivotally secured on one end to one of said first bracket means and having its opposite end operatively engageable with one end of said awning sheet bar, the improvement comprising:

a pair of second bracket means mounted on said support surface each pivotally mounting the lower end of one of said support arms and selectively retaining the opposite end of one of said brace members in parallel relationship with an associated one of said support arms and in spaced relationship from said support surface when the awning is retracted, said second bracket means each including a pair of spaced parallel plate-like side members extending in a substantially vertical direction, a substantially vertically extending web member interconnecting said side members to define a vertically extending channel opening outwardly away from said support surface, a pivot pin extending substantially horizontally between said side members and being operably connected to the lower end of one of said support arms to cooperate with the side members in pivotally supporting said support arm, said support arm when connected to said pivot pin cooperating with said side members and web member in defining a substantially vertically extending passage means through the second bracket, said passage means having a closed periphery and being adapted to receive and retain said opposite end of an associated brace member in parallel relationship with the support arm and in spaced relationship from said support surface when the awning is retracted, and mounting means on each of said second bracket means for mounting the second bracket means on said supporting surface.

2. In the awning assembly of claim 1, said space between the side members being of uniform cross-sectional size and configuration.

3. In the awning assembly of claim 1, said side members of the bracket having forward ends through which said pivot pin extends and rearward ends which extend outwardly into flanges to define said mounting means.

4. In the awning assembly of claim 1, wherein said support arm is of channelled configuration having a pair of generally parallel sides, said support arm being connected to said second bracket so that the sides of the support arm extend along the side members of the bracket on the outermost surfaces thereof.

* * * * *